(12) United States Patent
Tanaka et al.

(10) Patent No.: US 6,264,732 B1
(45) Date of Patent: Jul. 24, 2001

(54) PUNCTURE PREVENTIVE SEALANT

(75) Inventors: Akiko Tanaka; Toshio Yamagiwa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/613,831

(22) Filed: Jul. 11, 2000

Related U.S. Application Data

(63) Continuation of application No. 08/884,643, filed on Jun. 27, 1997, now abandoned.

(30) Foreign Application Priority Data

Jun. 27, 1996 (JP) .................................................. 8-168002
Jul. 3, 1996 (JP) .................................................. 8-173333

(51) Int. Cl.$^7$ ..................................................... C09K 3/12

(52) U.S. Cl. ................... 106/33; 106/164.4; 106/166.12; 106/187.1; 106/203.2; 523/166; 524/34; 524/35; 524/39

(58) Field of Search ................................... 106/33, 164.4, 106/166.12, 182.1, 203.2; 523/166; 524/34, 35, 39

(56) References Cited

U.S. PATENT DOCUMENTS

| 4,137,206 | | 1/1979 | Kent . | |
| 4,256,158 | * | 3/1981 | Chautard et al. | 106/33 |
| 4,867,792 | * | 9/1989 | Ronlan | 106/189 |
| 5,226,958 | * | 7/1993 | Bowman et al. | 106/33 |
| 5,772,747 | * | 6/1998 | Turner et al. | 106/33 |

* cited by examiner

Primary Examiner—David Brunsman
(74) Attorney, Agent, or Firm—Birch, Stewart, Kolasch & Birch, LLP

(57) ABSTRACT

A puncture preventive sealant capable of reducing the content of cellulose fibers for suppressing the cost of the sealant while keeping a high sealing performance due to the cellulose fibers. A sealant, which is filled in a sealant chamber defined in a tube adjacently to an air chamber, contains synthetic fibers and cellulose fibers in a solvent. The content of the synthetic fibers is in a range of from 75 to 90 wt % and the content of the cellulose fiber is in a range of from 25 to 10 wt %. Since the sealant is filled in the sealant chamber having a capacity significantly smaller than that of the air chamber, the separation of the synthetic fibers due to a centrifugal force substantially exert no adverse effect on the characteristics of the sealant. Accordingly, the content of the cellulose fibers can be set at such a minimum value so as to block a large puncture hole. As a result, it is possible to reduce the cost by reducing the content of the cellulose fibers.

18 Claims, 2 Drawing Sheets

PUNCTURE PREVENTIVE SEALANT

This application is a continuation of application Ser. No. 08/884,643, filed on Jun. 27, 1997, now abandoned the entire contents of which are hereby incorporated by reference.

BACKGROUND OF THE INVENTION

1. Field of the Invention

The present invention relates to a puncture preventive sealant filled in a sealant chamber defined in a tube adjacently to an air chamber.

2. Description of Related Art

Japanese Patent Laid-open No. Sho 50-72303 discloses a technique in which a sealant containing a fiber component is enclosed in a tire tube of an automobile for repairing damage to the tube. For example, if the tube is pierced by a nail or the like, the sealant prevents leakage of air from the tube. This sealant contains short-fibers and a fine crystal powder of cellulose in a liquid polymer or an aqueous solution, wherein the ratio of the fine crystal powder of cellulose is set to be larger than that of the short-fibers for suppressing the flow of the short-fibers in the tube.

The above-described sealant has been developed from the viewpoint of an extensive flow of a sealant in a tube, and has been configured wherein the content of the fine crystal powder of cellulose is set to be larger than that of the short-fibers for suppressing the flow of the short-fibers in the tube. Such a sealant, however, has a problem since the fine crystal powder of cellulose is produced by processing cellulose fibers and thereby it is higher in cost than the cellulose fibers, with a result that the increased content of the fine crystal powder of cellulose leads to a significantly increased cost.

SUMMARY AND OBJECTS OF THE INVENTION

In view of the foregoing, the present invention has been made, and an object of the present invention is to provide a sealant capable of reducing the content of cellulose fibers for suppressing the cost of the sealant while keeping a high sealing performance of the cellulose fibers.

According to the present invention, there is provided a puncture preventive sealant filled in a sealant chamber defined in a tube adjacent to an air chamber, the sealant includes a fiber component contained in a solvent, wherein the fiber component includes synthetic fibers and cellulose fibers which are mixed in such a mixing ratio that the content of the cellulose fibers is smaller than that of the synthetic fibers.

According to the present invention, there is provided a puncture preventive sealant wherein the content of the synthetic fibers is in a range of from 75 to 90 wt %, and the content of the cellulose fibers is in a range of from 25 to 10 wt %.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Figure 1:
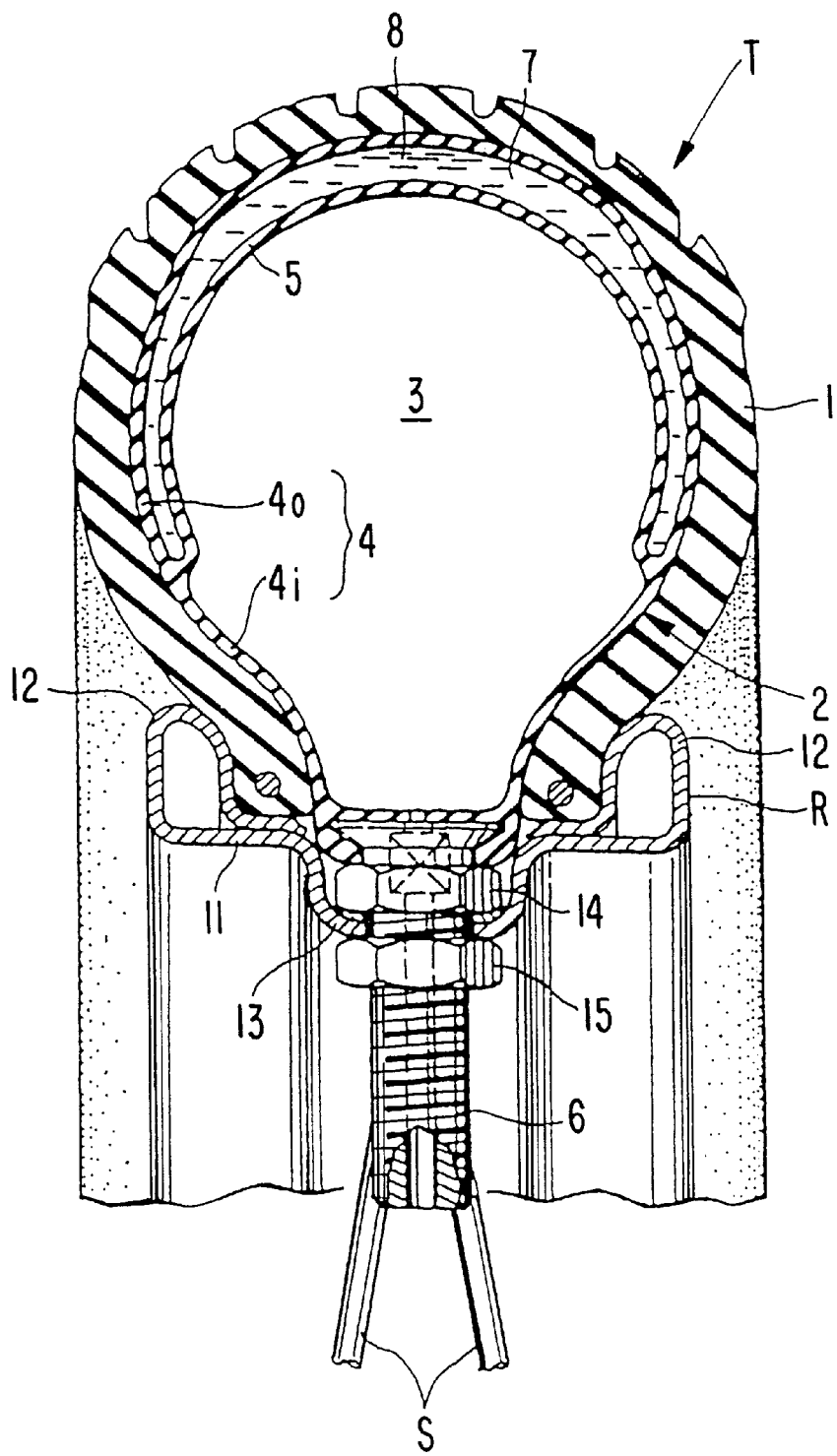
FIG. 1 is a transverse sectional view of a wheel mounted with a tube tire.

Hereinafter, preferred embodiments of the present invention will be described with reference to the accompanying drawings. As shown in FIG. 1, a rim R to be mounted on a wheel used for a motorcycle is connected to a hub (not shown) via wire spokes S. A tube tire T composed of a tire 1 and a tube 2 contained in the tire 1 is mounted on the rim R. The tube 2 has a peripheral wall 4 formed in an annular shape in cross-section, and the peripheral wall 4 is composed of an air chamber side peripheral wall 4*i* positioned radially inwardly and a sealant chamber side peripheral wall 4*o* positioned radially outwardly. A pair of connection portions for connecting the air chamber side peripheral wall 4*i* of the peripheral wall 4 to the sealant chamber side peripheral wall 4*o* thereof are connected to each other by a bulkhead 5 formed integrally therewith. An air chamber 3 formed into an approximately circular shape in cross section, which is defined between the air chamber side peripheral wall 4*i* and the bulkhead 5, is filled with air. A sealant chamber 7 formed into an approximately arcuate shape in cross section, which is defined between the sealant chamber side peripheral wall 4*o* and the bulkhead 5, is filled with a liquid sealant 8 which will be described later.

The rim R includes an annular rim main body 11 extending in the circumferential direction of the tube tire T and a pair of flange portions 12, 12 extending radially outwardly from both the radial ends of the rim main body 11 and holding the inner periphery of the tire 1. An air valve 6 for filling the air chamber 3 formed in the tube 2 with air, passes through an air valve mounting portion 13 formed at a position in the circumferential direction of the rim main body 11 and is fixed by nuts 14, 15.

Since the sealant chamber 7 of the tube 2 is held in a shape following the inner surface of the tire 1 by an air pressure of the air chamber 3, the sealant 8 filled in the sealant chamber 7 is prevented from being shifted on the outer peripheral side of the tube 2 even when the sealant 8 is applied with a centrifugal force due to the rotation of the wheel. Accordingly, even when the tube 2 is pierced with a nail or the like in the radial or sideward direction, the pierced portion is immediately buried with the sealant 8 to be thus repaired, so that it is possible to retard the leakage of air from the air chamber 3. Additionally, since the sealant 8 is held in the sealant chamber 7 and is not allowed to flow on the air chamber 3 side, it does not block the air valve 6 or a pressure gauge connected to the air valve 6.

Next, a process of manufacturing the tube 2 will be described. The tube 2 is manufactured in accordance with manufacturing steps including a material kneading step, a tube material extrusion molding step, a cutting step, an air valve mounting step, a piercing step, a joining step, a first vulcanizing step, a sealant filling step, a raw rubber sheet sticking step, a second vulcanizing step, and an inspection step.

Figure 2:
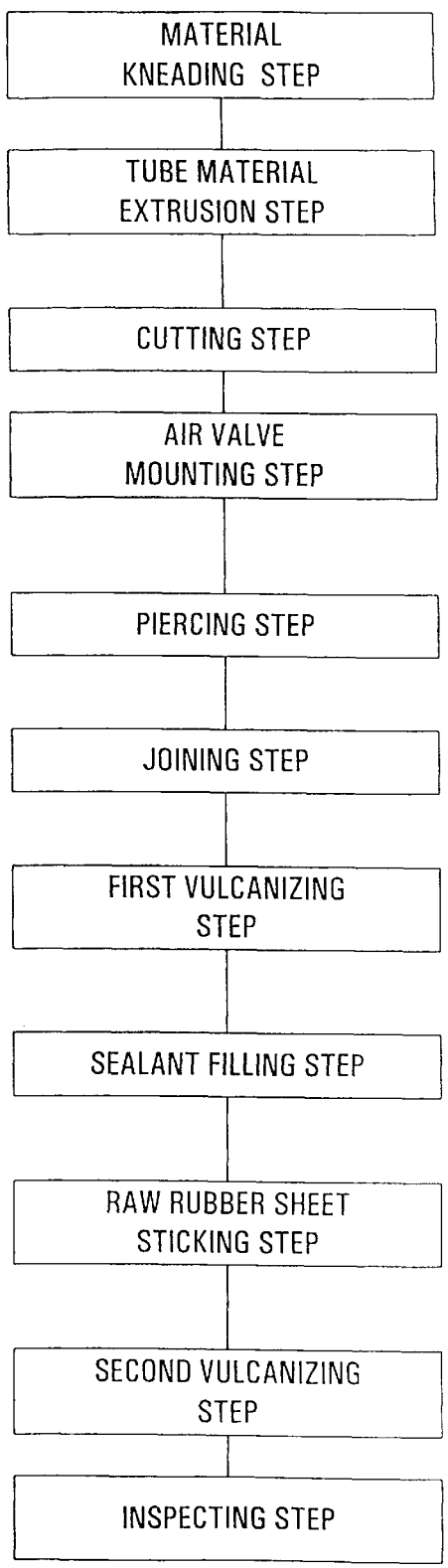
FIG. 2 is a flow chart illustrating steps for manufacturing a tube.
Figure 2:
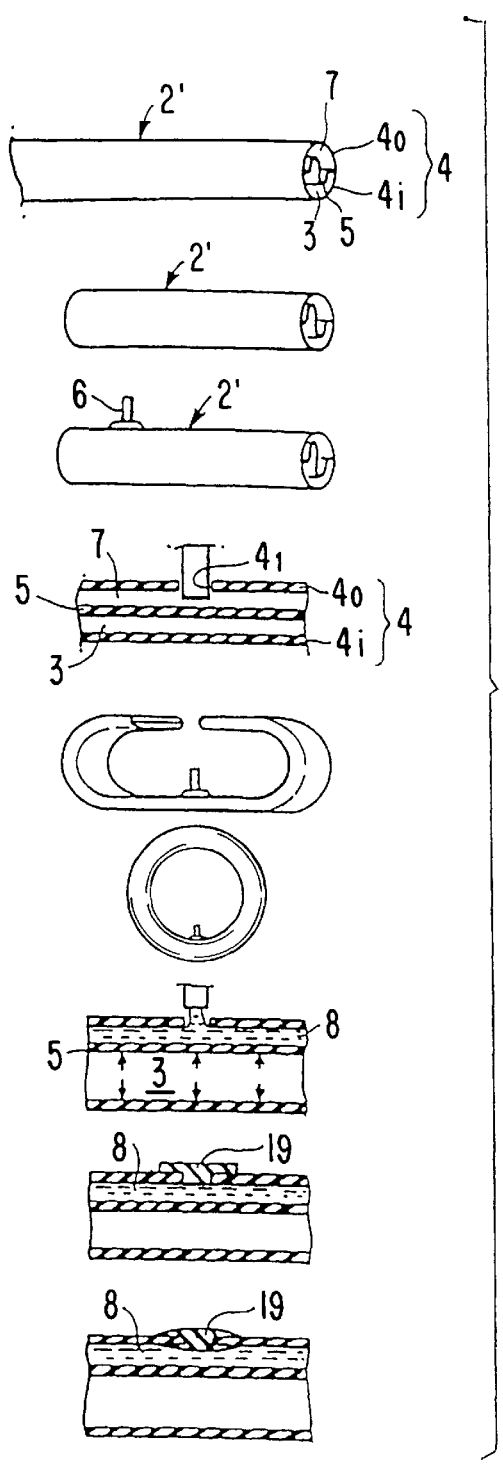

As illustrated in FIG. 2, first, a raw rubber kneaded at the material kneading step is extrusion-molded at the tube material extrusion molding step, to form a tube material 2' is made of the raw rubber. The tube material 2' continuously extrusion-molded from a nozzle of an extrusion molding machine and includes a peripheral wall 4 formed into a circular shape in transverse cross-section and a bulkhead 5 connecting two points positioned along the diameter of the peripheral wall 4. The peripheral wall 4 is divided into an air chamber side peripheral wall 4$i$ and a sealant chamber side peripheral wall 4$o$ with respect to the portions connected to the bulkhead 5.

The tube material 2' is cut into a specified length at the subsequent cutting step, and an air valve 6 is mounted at a suitable position on the air chamber side peripheral wall 4$i$ during the air valve mounting step. At the piercing step, the sealant chamber side peripheral wall 4$o$ of the tube material 2' is pierced to form sealant filling holes $4_1, \ldots, 4_1$.

Both the end portions of the tube material 2' are joined to each other at the subsequent joining step, and at the first vulcanizing step, the tube material 2' is inserted in a heating die, and the air chamber side peripheral wall 4$i$ and the sealant chamber side peripheral chamber 4$o$ are brought in close-contact with the heating die and the bulkhead 5 is also brought in close-contact with the sealant chamber side peripheral wall 4$o$ by supplying heated air or a high temperature steam into the air chamber 3 from the air valve 6. In such a state, vulcanization is performed by heating the heating die.

At the subsequent sealant filling step, the sealant 8 is supplied from the sealant filling holes $4_1, \ldots, 4_1$ to fill the sealant chamber 7. At this time, by expanding the air chamber 3 by the supply of air from the air valve 6 prior to the filling of the sealant 8, the bulkhead 5 is brought in close-contact with the sealant chamber side peripheral wall 4$o$ to perfectly discharge the air in the sealant chamber 7. In such a state, the filling of the sealant 8 is started. The starting of the filling of the sealant 8 in the state where the air in the sealant chamber 7 is perfectly discharged, it is possible to effectively prevent the entrapment of air in the sealant 8 and hence to fill the sealant chamber 7 with only the sealant 8. Additionally, since the air is supplied into the air chamber 3 using the air valve 6, it is possible to eliminate the need for the provision of an air filling hole in the air chamber side peripheral wall 4$i$.

A raw rubber sheet 19 is stuck on the peripheral wall 4 so as to cover the sealant filling holes $4_1, \ldots, 4_1$ during the raw rubber sheet sticking step, and then the sealant filling holes $4_1, \ldots, 4_1$ are blocked by local vulcanization of the vicinity of the raw rubber sheet 19 at the second vulcanization step, to finish the tube 2. Since the sealant filling holes $4_1, \ldots, 4_1$ are blocked using the raw rubber sheet 19 being the same material as that of the tube material 2', it is possible to improve the strength of the blocking portion, and hence to effectively prevent leakage of the sealant 8. Thus, the finished tube 2 is inspected at the inspection step, to complete the manufacturing steps.

Next, the composition of the sealant 8 will be described. The sealant contains synthetic fibers and cellulose fiber in a solvent. As the solvent, any organic solvent or any mixed solution of an organic polymer may be used which has an effect of depressing a freezing point and an effect of imparting a suitable viscosity to the sealant. Specific examples of the solvent include a liquid organic polymer such as liquid polyethylene glycol, liquid propylene glycol or liquid polybutadiene; a solution or a solid polymer dissolved in an organic solvent such as a solution of methyl vinyl ether-maleic anhydride copolymer dissolved in ethylene glycol; a solution of vinyl acetatemaleic anhydride copolymer dissolved in ethanolamine; a solution of a solid organic polymer dissolved in organic solvent/water such as a solution of methyl hydroxypropyl cellulose dissolved in ethylene glycol/water; an emulsion of a solid organic polymer such as a mixed emulsion of polyvinyl acetate, ethylene glycol and water; and a mixed solution of two or more of the above solutions.

As the synthetic fibers contained in the solvent, there may be used short-fibers of polyester, nylon, Vinylon, or acrylic resin. Vinylon is a trademark that identifies fibers of polyvinyl acetate, polyvinyl alcohol and derivatives thereof. The length of the short-fibers is preferably in a range of from 1 to 7 mm. As the cellulose fibers contained in the solvent, there may be used a natural cellulose such as dissolved pulp, cotton or linen; a regenerated cellulose such as rayon or cellophane; and an oxide thereof. In this embodiment, cotton is used as cellulose fibers.

The amount of the fiber component contained in the solvent, that is, the total weight of the synthetic fibers and the cellulose fibers contained in the solvent is set to be in a range of 0.5 to 10% on the basis of the weight of the solvent. The content of the synthetic fibers is set to be in a range-of from 75 to 90% and the content of the cellulose fibers is set to be in a range of from 25 to 10%.

The synthetic fibers are substantially straightened in shape and are excellent in flowability, and thereby they function to be readily inserted in a puncture hole opened in the tube 2 and to block it by a force of the tube 1 applied to contract the puncture hole. On the other hand, the cellulose fibers are softer than the synthetic fibers, and thereby function to be entangled with the synthetic fibers. Accordingly, in the case where the puncture hole is large and the force of the tube 2 applied to contract the puncture hole is small, the cellulose fibers are entangled with the synthetic fibers, to increase the sliding resistance of the entangled fibers with the puncture hole, thereby blocking the puncture hole.

In this embodiment, since the sealant 8 is filled in the sealant chamber 7 having a capacity significantly smaller than that of the air chamber 3, the separation of the synthetic fibers from the solvent substantially exert no adverse effect on the characteristics of the sealant even when the sealant is applied with a centrifugal force due to the rotation of the wheel. Accordingly, the content of the cellulose fibers can be selected at such a minimum value so as to block a large puncture hole (that is, in a range of 10 to 25% on the basis of the weight of the total fibers), to thereby reduce the cost. Namely, when the ratio of the cellulose fibers is less than 10%, the sealing effect becomes smaller. On the other hand, when the content of the cellulose fibers is more than 25%, the cost is increased, and further, since the flowability of the synthetic fibers is obstructed, the time required for sealing a puncture hole is made longer. Additionally, in this embodiment, since cellulose fibers are used which are lower in cost than a fine crystal powder of cellulose, the cost can be reduced.

Although the embodiments have been described using specific terms, such description is for illustrative purposes only, and it is to be understood that many changes in design may be made without departing from the scope of the present invention.

As described above, according to the present invention, since a sealant is filled in a sealant chamber defined in a tube adjacently to an air chamber, synthetic fibers contained in the sealant are difficult to be separated from a solvent as compared with the case in which the sealant is directly filled in the air chamber. As a result, since the separation of the synthetic fibers from the solvent is not taken into account, the content of expensive cellulose fibers can be set at such a minimum value so as to ensure a sealing performance for a large puncture hole, while keeping the flowability of the synthetic fibers. This makes it possible to reduce the cost while keeping a high sealing performance irrespective of the size of a puncture hole.

According to the present invention, since the content of the synthetic fibers is in a range of 75 to 90 wt % and the content of the cellulose fibers is in a range of from 25 to 10 wt %, it is possible to effectively reduce the cost while keeping a high sealing performance due to the cellulose fibers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A puncture preventive sealant comprising:

a sealant chamber defined in a tube positioned adjacent to an air chamber;

said sealant including a fiber component contained in a solvent;

wherein said fiber component comprises synthetic fibers and cellulose fibers which are mixed in a mixing ratio wherein the content of said cellulose fibers is smaller than that of said synthetic fibers.

2. The puncture preventive sealant according to claim 1, wherein the content of said synthetic fibers is in a range of from 75 to 90 wt %, and the content of said cellulose fibers is in a range of from 25 to 10 wt %.

3. The puncture preventive sealant according to claim 1, wherein the solvent is an organic solvent for depressing a freezing point and providing a suitable viscosity to the sealant.

4. The puncture preventive sealant according to claim 1, wherein the solvent is a mixed solution of an organic polymer for depressing a freezing point and providing a suitable viscosity to the sealant.

5. The puncture preventive sealant according to claim 1, wherein the solvent is a liquid organic polymer.

6. The puncture preventive sealant according to claim 5, wherein the liquid organic polymer is liquid polyethylene glycol.

7. The puncture preventive sealant according to claim 5, wherein the liquid organic polymer is liquid propylene glycol.

8. The puncture preventive sealant according to claim 5, wherein the liquid organic polymer is a liquid polybutadiene.

9. The puncture preventive sealant according to claim 1, wherein the liquid organic polymer is a solution of a solid polymer dissolved in an organic solvent.

10. The puncture preventive sealant according to claim 9, wherein the solution is methyl vinyl ether-maleic anhydride copolymer dissolved in ethylene glycol.

11. The puncture preventive sealant according to claim 9, wherein the solution is vinyl acetatemaleic anhydride copolymer dissolved in ethanolamine.

12. The puncture preventive sealant according to claim 1, wherein the solution is a solid organic polymer dissolved in organic solvent/water.

13. The puncture preventive sealant according to claim 12, wherein the solution is a methyl hydroxypropyl cellulose dissolved in ethylene glycol/water.

14. The puncture preventive sealant according to claim 1, wherein the solution is an emulsion of polyvinyl acetate, ethylene glycol and water.

15. The puncture preventive sealant according to claim 1, wherein the synthetic fibers are selected from the group consisting of polyester, nylon, acrylic resin, polyvinyl acetate, polyvinyl alcohol and derivatives thereof.

16. The puncture preventive sealant according to claim 1, wherein the length of the synthetic fibers is in the range of from 1 to 7 mm.

17. The puncture preventive sealant according to claim 1, wherein the cellulose fibers are selected from the group consisting of dissolved pulp, cotton, linen, rayon, cellophane and an oxide thereof.

18. The puncture preventive sealant according to claim 1, wherein the total weight of the synthetic fibers and the cellulose fibers contained in the solvent is set to be in a range of 0.5 to 10% on the basis of the weight of the solvent.

* * * * *